(12) United States Patent
Boyes et al.

(10) Patent No.: US 11,754,220 B2
(45) Date of Patent: Sep. 12, 2023

(54) MODULAR CAMERA MOUNTS USABLE WITH SECURITY CAMERA OR ACCESS CONTROL APPLICATIONS

(71) Applicant: Johnson Controls Tyco IP Holdings LLP, Milwaukee, WI (US)

(72) Inventors: Derek Joseph Boyes, Aghalee (GB); Frederick Michael McBride, Belfast County Down (GB)

(73) Assignee: JOHNSON CONTROLS TYCO IP HOLDINGS LLP, Milwaukee, WI (US)

( * ) Notice: Subject to any disclaimer, the term of this patent is extended or adjusted under 35 U.S.C. 154(b) by 0 days.

(21) Appl. No.: 17/196,269

(22) Filed: Mar. 9, 2021

(65) Prior Publication Data
US 2021/0278037 A1    Sep. 9, 2021

Related U.S. Application Data

(60) Provisional application No. 62/987,195, filed on Mar. 9, 2020.

(51) Int. Cl.
| | |
|---|---|
| *F16M 13/02* | (2006.01) |
| *F16M 11/10* | (2006.01) |
| *G03B 17/56* | (2021.01) |

(52) U.S. Cl.
CPC .......... *F16M 13/022* (2013.01); *F16M 11/10* (2013.01); *G03B 17/561* (2013.01); *F16M 2200/00* (2013.01)

(58) Field of Classification Search
CPC ...... F16M 13/022; F16M 11/04; F16M 11/12; F16M 11/18; F16M 2200/00; G03B 17/56
(Continued)

(56) References Cited

U.S. PATENT DOCUMENTS 6,015,123 A * 1/2000 Perez ................. F16M 13/025
248/220.21
6,249,310 B1 * 6/2001 Lefkowitz ........ G08B 13/19619
348/E7.086
(Continued)

FOREIGN PATENT DOCUMENTS

CN     207573484 U    7/2018
JP     2021036290 A *  3/2021

*Primary Examiner* — Stephanie E Bloss
*Assistant Examiner* — Kevin C Butler
(74) *Attorney, Agent, or Firm* — ArentFox Schiff LLP

(57) ABSTRACT

The present disclosure relates to camera mounts and cameras implementable in mounting-restricted environments. The camera mount may comprise a bracket and an optional cover, wherein the bracket may be configured to mount to a surface and the bracket configured to protect the camera. The bracket may include a mounting portion, an angled portion and an adjustment portion, which each may be configured to angle the camera relative to the surface. The mounting component may be configured to include a clearance portion that may facilitate angling the camera. The angled portion may be configured to be a wedge angled relative to the surface. The adjusting portion may be pivotable around an axis parallel to the surface such that in combination, the adjusting portion and the angled portion may facilitate the positioning of the camera to include a viewing angle that may vary up to 65°.

20 Claims, 19 Drawing Sheets

(58) Field of Classification Search
USPC .......................................................... 396/428
See application file for complete search history.

(56) References Cited

U.S. PATENT DOCUMENTS

| | | | | |
|---|---|---|---|---|
| 6,354,750 | B1* | 3/2002 | Romanoff | G03B 17/00 |
| | | | | 396/428 |
| 6,476,856 | B1* | 11/2002 | Zantos | G08B 13/1963 |
| | | | | 348/E5.026 |
| 7,011,460 | B1* | 3/2006 | Todd | G03B 17/561 |
| | | | | 396/427 |
| 7,306,383 | B2* | 12/2007 | Jones | G08B 13/19619 |
| | | | | 348/373 |
| 7,440,027 | B2* | 10/2008 | Weaver | F16M 13/027 |
| | | | | 348/375 |
| 9,004,785 | B1 | 4/2015 | Mohan | |
| 9,551,453 | B2* | 1/2017 | Walters | F16M 11/12 |
| 9,594,294 | B2* | 3/2017 | Linden | G08B 13/19632 |
| 9,952,485 | B1* | 4/2018 | Luski | G03B 17/561 |
| 10,267,454 | B1* | 4/2019 | Ortiz | F16B 1/00 |
| 10,277,825 | B2* | 4/2019 | Wang | B60R 11/04 |
| 10,389,982 | B1* | 8/2019 | Fu | H04N 7/185 |
| 10,844,997 | B1* | 11/2020 | Loew | F16M 13/00 |
| 11,050,907 | B1* | 6/2021 | Yoo | H04N 5/2259 |
| 11,375,087 | B1* | 6/2022 | Rhoden | H04N 5/23293 |
| 2004/0119881 | A1 | 6/2004 | Matko et al. | |
| 2005/0031335 | A1* | 2/2005 | Itzkowitz | F16M 13/02 |
| | | | | 396/419 |
| 2007/0278366 | A1* | 12/2007 | McGill | F16M 13/00 |
| | | | | 248/176.3 |
| 2007/0278373 | A1* | 12/2007 | Wang | B60R 11/00 |
| | | | | 248/419 |
| 2008/0277540 | A1* | 11/2008 | Heibel | F16M 13/022 |
| | | | | 248/187.1 |
| 2018/0075786 | A1* | 3/2018 | Thul | G09F 19/22 |
| 2018/0187828 | A1* | 7/2018 | Law | F16M 11/125 |
| 2020/0340620 | A1* | 10/2020 | Law | F16M 11/16 |
| 2021/0076829 | A1* | 3/2021 | Clapp | F16B 21/02 |
| 2021/0099619 | A1* | 4/2021 | Hertzman | H04N 5/2258 |
| 2021/0109423 | A1* | 4/2021 | Ramones | F16C 11/0609 |
| 2021/0278037 | A1* | 9/2021 | Boyes | G03B 17/561 |
| 2021/0278754 | A1* | 9/2021 | Boyes | F16M 11/2014 |
| 2021/0278755 | A1* | 9/2021 | Boyes | G08B 13/19632 |

* cited by examiner

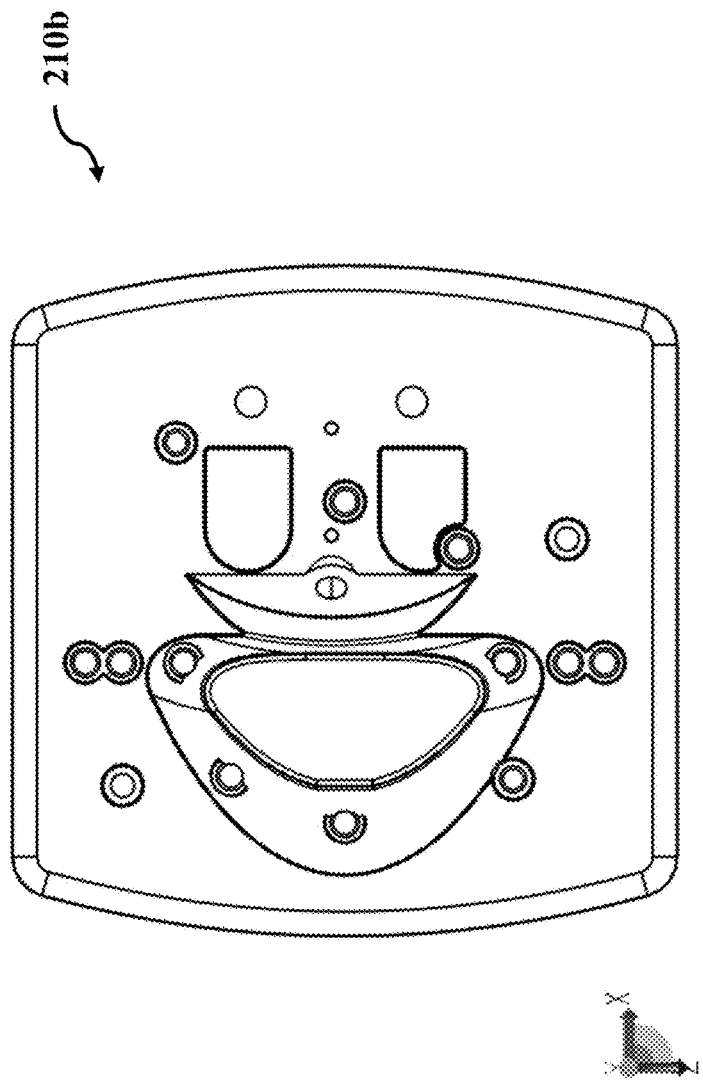
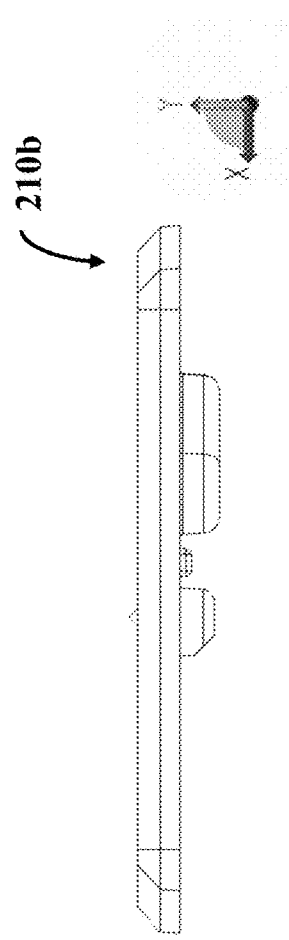
FIG. 17A
FIG. 17B

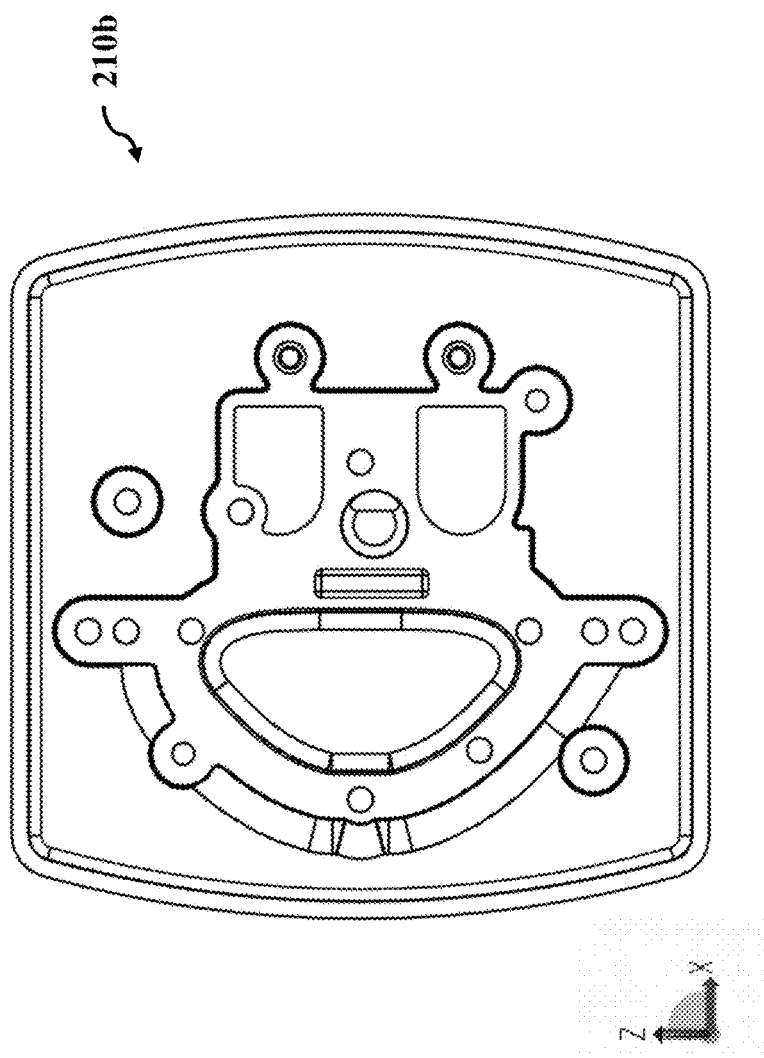
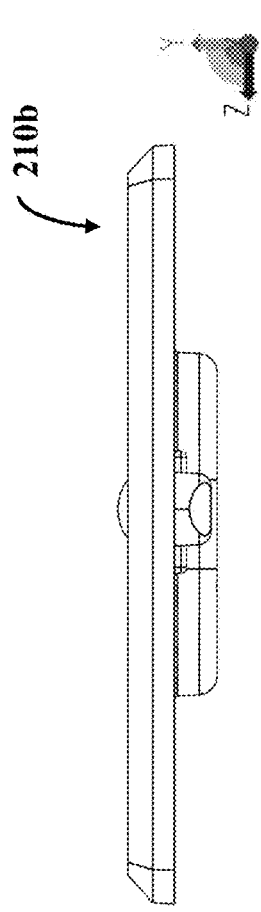
FIG. 18A
FIG. 18B

MODULAR CAMERA MOUNTS USABLE WITH SECURITY CAMERA OR ACCESS CONTROL APPLICATIONS

This application claims priority to U.S. Provisional Application No. 62/987,195 filed on Mar. 9, 2020, and titled "MODULAR CAMERA MOUNTS USABLE WITH SECURITY CAMERA OR ACCESS CONTROL APPLICATIONS," the contents of which is hereby incorporated by reference in the entirety.

TECHNICAL FIELD

Aspects of the present disclosure relate to camera mounts configured to securably mount cameras for security, surveillance, or access control or other implementations in a variety of different environments, such as environments that have limited mounting areas or mount-limiting architecture.

BACKGROUND

With modern advances in technology, cameras have been implemented as security mechanisms capable of monitoring various physical locations or acting as access security or identity verification systems so as to replace the need for constant surveillance by human guards and/or to function either in conjunction with or as an alternative to keys, keypads, and/or radio frequency identification based systems. When configured to monitor or surveil, these cameras may be placed such that they are discrete and not otherwise noticeable to individuals within the space they record.

Thus, there exists an unmet need in the related art for a camera configured for security, surveillance, and/or access control that can be mounted in a variety of different environments that include a variety of different materials and architectural styles.

SUMMARY

Consequent of the deficiencies described above, as well as others, there remains an unmet need for a camera configured for surveillance, security, access control, or other similar needs, wherein the camera includes a modular mount interoperable with the camera, such that the camera may be positioned to cover a desired field of view while still being aesthetically pleasing and well protected in a variety of different environments. Aspects of the present disclosure relate, among other things, to camera mounts interoperable with security cameras and/or access control cameras implementable in a variety of different environments. The camera mount, according to various aspects, includes a bracket, wherein the bracket may be configured to be secured to a mounting surface. Further, the camera mount may include an angled portion configured to angle the camera relative to the mounting surface, and an angular adjustment bracket, wherein the angular adjustment bracket may be configured to allow for adjusting the angle of the field of view of the camera relative to the mounting surface. The mounting component may include a plurality of mounting holes, wherein the plurality of mounting holes may be configured to align with a plurality of mounting provisions positioned within the angled portion. The mounting component may further be configured to include a clearance portion, wherein clearance portion may be configured to allow for additional clearance space for angling or re-positioning the camera with respect to the mounting surface. In one example the clearance portion may be configured to be an opening; however, in another example the clearance portion may be configured to be a concave recess. Both the mounting component and the angled portion may include cable route openings, such that a cable may electrically connect the camera to an external source of power. The angled portion may be configured as a wedge, wherein the wedge may be angled at 45° relative to the mounting surface in one example, and may be angled at 25° relative to the mounting surface in another example. The angled portion may interoperate with an adjusting portion, wherein the adjusting portion may be configured to be pivotable 20° around an axis parallel to the mounting surface. In combination, the adjusting portion and the angled portion may facilitate the positioning of the camera such that the camera includes a viewing angle that may vary up to 65° relative to the mounting surface.

The camera mount may further include a cover, wherein the cover may be configured to interoperate with the bracket at the mounting component, such that the cover may at least partially cover the camera, such that the camera may be protected from externally applied blunt forces, normal wear and tear, or otherwise. Specifically, the cover may be configured to include a first tab and a second tab, wherein the first tab may interoperate with a first cover tab receiving portion positioned within the mounting component and the second tab may interoperate with a second cover tab receiving portion, also positioned within the mounting component. Further, the mounting component may be configured to include at least two cover interface surfaces, wherein the cover interface surfaces may be configured to support the cover via frictional contact with a corresponding plurality of bracket interface surfaces positioned within the cover.

Additional advantages and novel features of these aspects will be set forth in part in the description that follows, and in part will become more apparent to those skilled in the art upon examination of the following or upon learning by practice of the disclosure.

BRIEF DESCRIPTION OF THE FIGURES

FIGS. 17A and 17B are top and left side views of the example mounting component of FIG. 16 according to aspects of the disclosure.

FIGS. 18A and 18B are bottom and front views of an example mounting component of FIGS. 16-17B according to aspects of the disclosure

DETAILED DESCRIPTION

Figure 1:
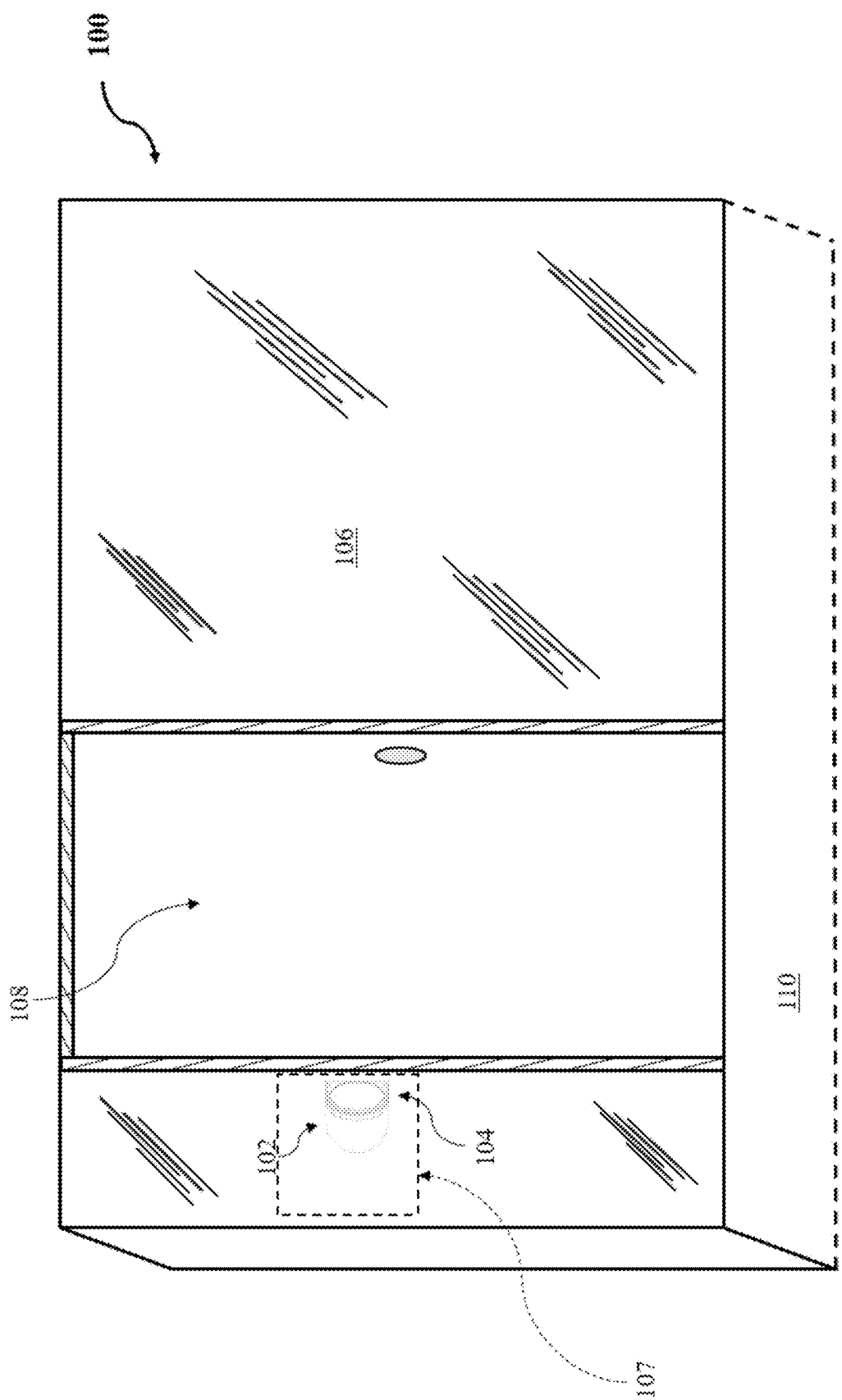
FIG. 1 is a front view of an environment, including a door, a door frame, a hallway, and an adjacent wall comprising an architecture having limited mounting capabilities, in which an example camera mount and camera are implemented, according to aspects of the present disclosure.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details.

Throughout the disclosure, the terms substantially or approximately may be used as a modifier for a geometric relationship between elements or for the shape of an element or component. While the terms substantially or approximately is not limited to a specific variation and may cover any variation that is understood by one of ordinary skill in the art to be an acceptable variation, some examples are provided as follows. In one example, the terms substantially or approximately may include a variation of less than 10% of the dimension of the object or component. In another example, the term substantially may include a variation of less than 5% of the object or component. If the terms substantially or approximately are used to define the angular relationship of one element to another element, one non-limiting example of the term substantially or approximately may include a variation of 5 degrees or less. These examples are not intended to be limiting and may be increased or decreased based on the understanding of acceptable limits to one of skill in the relevant art.

For purposes of the disclosure, directional terms are expressed generally with relation to a standard frame of reference when the system and apparatus described herein is installed an in an in-use orientation. In order to provide context to the current disclosure, a broad overview of the discovered deficiencies of various systems and an example implementation of the current disclosure and the advantages provided by the disclosure are described below. Further details of example implementations of the current disclosure are described in detail with reference to the figures below.

In some implementations, when cameras are configured to function as an access control function or identity verification system, these cameras may be placed in comparatively more obvious locations as compared to typical surveillance cameras, such at eye level or otherwise adjacent to a door (as compared to on a ceiling or a high wall), for example, in order to facilitate facial recognition technology or other similar identification methods by the cameras. When these cameras are used for performing access control within environments designed to include walls, doors, and other physical barriers without a sufficient space or area in which a camera may be secured, conventional security cameras are often not mountable to provide the field of view required for access control due to space constraints. In environments that have tight spaces such as narrow corridors, angled corners, or long hallways, for example, there are also often limited adequate locations in which a camera may be secured within the environment. For example, typical mounting locations of cameras high on a ceiling may not provide the field of view necessary for recognizing individually recognizable features, such as a face, of mobility-aided individuals. In this scenario, a camera must be mountable at a sufficiently lower height, such that access control and/or identity verification methods may be implemented on mobility-aided individuals and non-mobility-aided individuals alike. Further, in mounting a camera system lower than a height typically used for surveillance, a camera may be more susceptible to contact a person or an object in the environment. Thus, aspects of the present disclosure may further be related to a cover that protects a camera system. Aspects of the present disclosure may further provide a pleasing aesthetic while allowing for improved mounting of the camera system.

In addition, a user or installer may wish to limit the number of holes and/or other permanent specialized fixtures necessary to mount such a camera system. Thus, it may be useful to mount a camera used for access control purposes to a standard or commonly used fixture that is either already installed within a wall and/or that may be installed in the wall. In one example, the fixture may be hidden from view, for example, within a wall plate. One example of the aforementioned standard fixture is an electrical outlet box or "gang box," which may be used for switches, electrical outlets, and/or which may be installed solely for the purpose of installing an access control camera system.

The present disclosure provides one or more advantages in such scenarios or installations, including providing one or more implementations of a camera mount system that allows flexibility by providing interchangeable components for adjusting the angle of the camera with relation to a mounting surface and/or for providing an adaptable interface for various standard electrical outlet boxes or other mounting fixtures.

FIG. 1 shows one example, in-use orientation of a camera 104 via a camera mount 102 within a mounting-restricted environment 100 according to various aspects of the present disclosure. A mounting-restricted environment 100 may, for example, include a physical location, such as indoor locations including but not limited to hallways, corridors, atriums, waiting rooms, etc., or outdoor locations, such as entrances and porches, for example. Camera mounting locations at the appropriate height may be limited due to the architecture, layout, and/or inanimate objects occupying the environment. For example, the mounting-restricted environment 100 of FIG. 1 may include a hallway 110 leading to a door 108 disposed within a wall 106. The Wall 106 and door 108 may be configured to limit access to a designated space located behind wall 106 and door 108, wherein hallway 110 may be configured to be more generally accessible. Further, door 108 and wall 106 may be oriented such that there may be limited or insufficient locations to secure traditional security cameras, surveillance cameras, access control cameras, or other similar monitoring cameras, such that the camera 104 may be positioned adequately relative to the people, or objects that the camera 104 is configured to monitor and/or recognize for access control. The camera mount 102 may allow camera 104 to be mounted within mounting-restricted environment 100 at a first mounting surface 107. First mounting surface 107 may include a mountable material, such as but not limited to a metal, a plastic, a composite, and/or sheet-rock. In FIG. 1, first surface 107 may be a wall; however, first surface 107 is not limited to including only walls. The camera 104 and camera mount 102 may be configured such that together, camera 104 and camera mount 102 may be sufficiently compact, as to not become a hazard to people that may occupy environment 100, for example, if a person was to walk by and then accidentally bump camera 104 and camera mount 102. The camera mount 102 may be configured to protect the camera 104 in the aforementioned scenario. Various aspects of the present disclosure will be described in greater detail in the sections that follow.

Figure 2:
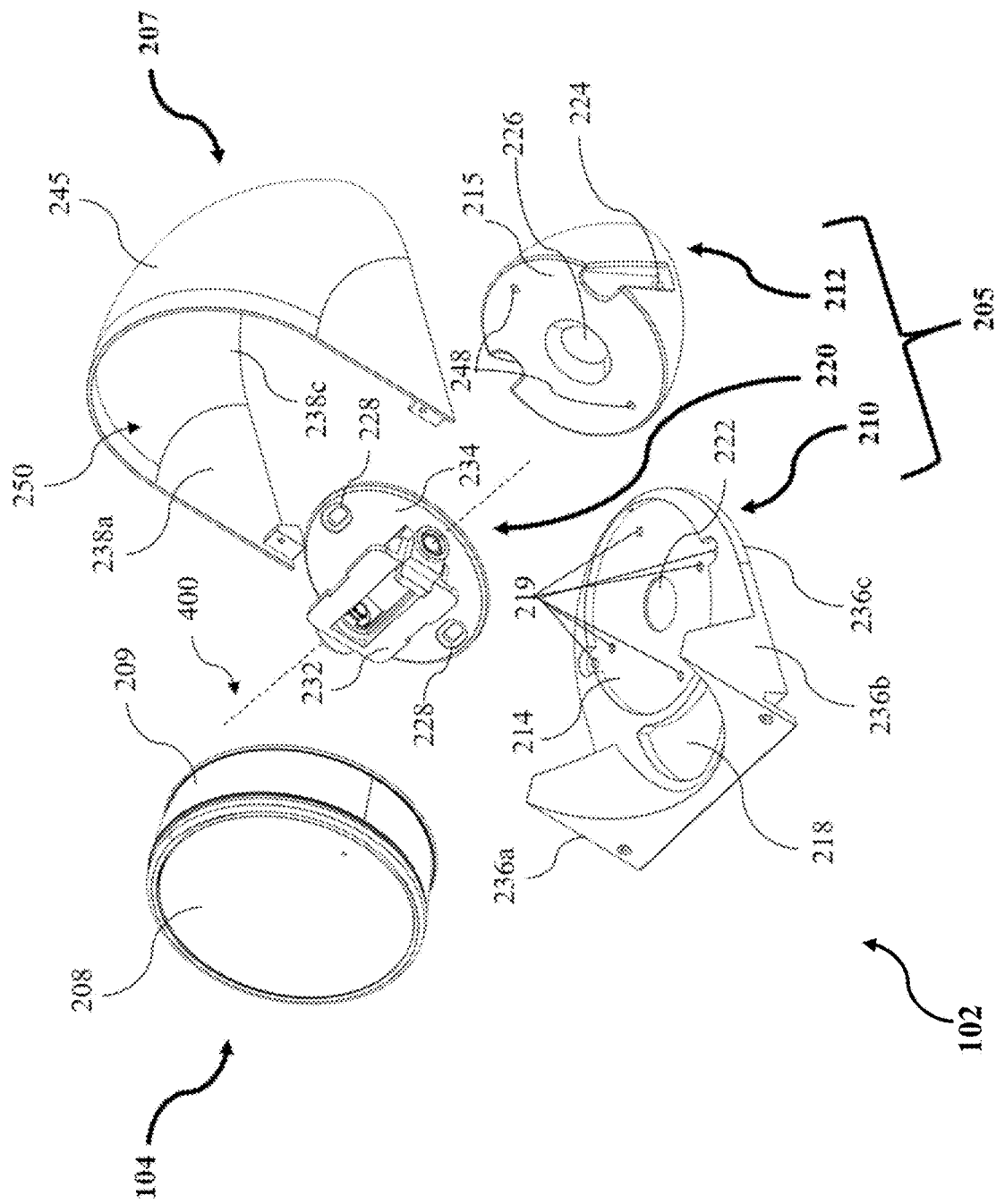
FIG. 2 is a front exploded perspective view of an example camera mount and camera, according to aspects of the present disclosure.

Referring to FIG. 2, according to various aspects of the present disclosure, the camera 104 may include a camera body 209 and one or more camera lens 208. The one or more camera lenses 208 may include fixed or movable lenses, concave and/or convex lenses, and/or flat lens (or cover lens). For example, one or more camera lenses 208 may function as a cover that provides protection to a single or a plurality of camera lenses beneath the one or more cover lenses. Further, the camera body 209 may be configured to house the one or more camera lenses 208. In one example, the camera 104 may include a single or plurality of wide angle cameras and/or lenses configured to monitor at least a 110° angle of view, or other implementations up to a 63° angle of view. Camera body 209 may further house a variety of electronic equipment necessary for the operation of the camera 104 that is well known to one of ordinary skill in the art, such as a lens aperture, mirrors, or a focusing screen, for example. Camera 104 may be configured to perform a variety of security, surveillance, or access control functions. In one example camera 104 may be configured to surveil or monitor at least a portion of the environment in which it is located. Further, camera 104 may be configured to operate as an access reader either as an alternative to or in conjunction with the aforementioned surveillance functions. In this example, camera 104 may be configured with facial recognition technology and/or configured to provide a video feed to a computer that is capable using the video feed, for example via a network, for facial recognition purposes, and may be secured to a first surface (e.g., first surface 207 in FIG. 2) such that camera 104 may be positioned to accurately recognize and/or provide signal representative of a field of view adequate to provide signals to a computer to recognize facial features of individuals of a plurality of heights, including those individuals in wheel chairs or other mobility aiding devices.

Camera mount 102 may include a bracket 205 that may be interoperable with an optional cover 207 (see FIG. 2). The bracket 205 may facilitate securably mounting camera 104 to the first surface 107, (see FIG. 1), while cover 207 may protect or otherwise conceal camera 104. Cover 207 may include a first opening portion 250 (see FIG. 2), configured to provide a line-of-sight for at least a field of view of the camera 104. The cover 207 may also include a second opening portion 252 (see FIG. 3), configured for receiving bracket 205. In order to deflect camera 104 from a blow or blunt force, in one example, cover 207 may be configured to be substantially dome-shaped, such that the blow may glance off or be deflected away from cover 207, and thus camera 104. Bracket 205 may include a camera mounting bracket 210, which may hereinafter be interchangeably referred to as a mounting component 210, wherein mounting component 210 may be configured to securably fix camera 104 to a mounting surface. The bracket may further include an angled portion 212. The angled portion 212 may be configured to position camera 104 and the field of view of camera 104 relative to the mounting surface, and an adjusting portion 220, wherein adjusting portion 220 may be configured to additionally adjust the position of camera 104 and the field of view of camera 104 relative to the mounting surface.

Mounting component 210 may include a first mounting portion 214. The first mounting portion 214 may be configured to securably fix mounting component 210 to angled portion 212, and a second mounting portion 216 (see FIG. 3), wherein second mounting portion 216 may be configured to secure bracket 205 to an external mounting surface (e.g., mounting surface 107 in FIG. 1). First mounting portion 214 may be configured to be substantially circular in area, such as illustrated in FIG. 2. However, first mounting portion 214 is not limited to a substantially circular configuration, and consequently may be configured to be a variety of different geometric shapes, such as rectangular, ovular, or triangular, for example. Further, the approximate shape or area of first mounting portion 214 may be configured based on the shape, size, or a variety of other parameters dictated by camera 104. In one aspect, the first mounting portion 214 may be formed as a recess that corresponds with a shape of a base 217 (see FIG. 3) of angled portion 212 thus allowing the angled portion to be at least partially received within the recess at mounting portion 214, which may assist with assembly of the bracket 205. In one aspect of the disclosure shown in FIG. 4, for example, a mounting component 210b may include a flat surface 214b for mounting an angled portion 212b thereto via mounting holes 219b. It is noted that throughout the disclosure, aspects shown in FIGS. 1-3, and 5-9 may be interchangeable and/or applicable with aspects shown in FIG. 4. Additional views of the example mounting component 210b are shown in FIGS. 16-19B. Additional views of the example angled portion 212b are shown in FIGS. 12-15B.

Turning to FIGS. 1-4. First mounting portion 214 and/or 214b may be configured to include a plurality of mounting holes 219 or 219b, respectively. The mounting holes 219 and/or 219b may be configured to facilitate the mounting, securing, or otherwise, of angled portion 212 and/or 212b to first mounting portion 214 and/or 214b of mounting component 210 and/or 210b. In one example, any one or a combination of the mounting holes 219 and/or 219b may be configured to be substantially circular openings, such that any one or a combination of mounting holes 219 and/or 219b may receive a plurality of threaded fasteners (not shown). However, mounting holes 219 and/or 219b are not limited to be substantially circular in shape, and may be configured to be a plurality of different shapes based on the shape, size, and threading, for example, of the plurality of fasteners. In another aspect, any one or a combination of the mounting holes 219 and/or 219b may be positioned so as to align with a variety of standard wall-mounting plates and/or electrical boxes. For example, a first set of mounting holes may be configured to align with a standard U.S. size wall plate, which may for example have nominal dimension of 2.75 inches by 4.5 inches with two holes that are 3.25 inches center to center. Likewise, a second set of holes may be configured to align with a standard United Kingdom or European wall plate having nominal dimensions of 3.425 inches by 3.425 inches with two holes that are 2.374 inches center to center. It is noted that the aforementioned spacing's are only intended as examples, the mounting component 210 and/or 210b may have holes and/or hole spacing's to accommodate any hole spacing, which may for example correspond with universal switch plates and/or cover plates that are standard in various regions of the world.

Mounting component 210 and/or 210b may further include a clearance portion 218 and/or 218b, wherein clearance portion 218 and/or 218b may be configured to allow for additional clearance space for angling or other similar forms of re-positioning camera 104 with respect to the external mounting surface. In one example, clearance portion 218 and/or 218b may be configured to be an opening (e.g., as shown by reference 218 in FIGS. 2 and 3); however, in another example, clearance portion 218b may be configured to be a concave recess (e.g., as shown by reference 218b in FIG. 4), wherein clearance portion may contain less material than the surrounding areas of mounting component 210 and/or 210b, for example. Clearance portion 218 and/or 218b is not limited to the above described examples, however, and may include of any plurality of mechanisms that allow for an increased clearance space for angling or re-positioning of camera 104. Mounting component 210 and/or 210b may further include a cable opening 222 or a plurality of cable openings 222b, wherein cable route opening(s) 222 and/or 222b may be configured such that a cable or cable may electrically connect camera 104 to an external power source and/or a network via a cable, wire, or other electrically conductive pathway.

In order to facilitate the interoperation of mounting component 210 and cover 207, mounting component 210 and/or 210b may be configured to include a plurality of cover interface surfaces, such as cover interface surfaces 236a-236c (see FIGS. 2-3), wherein the cover interface surfaces 236a-236c may provide structural support to cover 207 via frictional contact between cover interface surfaces 236a-236c and a corresponding plurality of bracket interface surfaces, such as bracket interface surface 238a (see FIG. 2), bracket interface surface 238b (see FIG. 3), and bracket interface surface 238c (see FIGS. 2-3), wherein bracket interface surfaces 238a-238c may be component parts of cover 207. In the example shown in FIGS. 2-3, the cover interface surfaces 236a-c may include a first cover interface section 236a and a second cover interface section 236b that extend from a location proximal to a first tab receiving portion (e.g., 802a in FIG. 8) and as second tab receiving portion (e.g., 802b in FIG. 8). The extended surface area of the first cover interface section 236a and the second cover interface section 236b may further provide structural support to cover 207. In one example, both bracket interface surface 236 and the cover interface surface 238 may be configured to be curved surfaces. In another example, however, bracket interface surfaces 236a-236b and cover interface surfaces 238a-238c may be configured to be substantially non-curved, wherein first cover interface surface 238a may be connected to second cover interface surface 238b via a curved connecting portion 245 (see FIGS. 2-3).

It is noted that the cover 207 may be optional. As mentioned above, one example aspect of the disclosure is shown in FIG. 4, which may or may not be used with a cover 207. While a cover covers is not shown in FIG. 4, a cover 207 (FIGS. 2-3) or a similar cover may be connected to the mounting component 201b via any one or a combination of the mounting holes 218b and/or via a press-fit, snap-fit, and/or any known fastening method.

Figure 3:
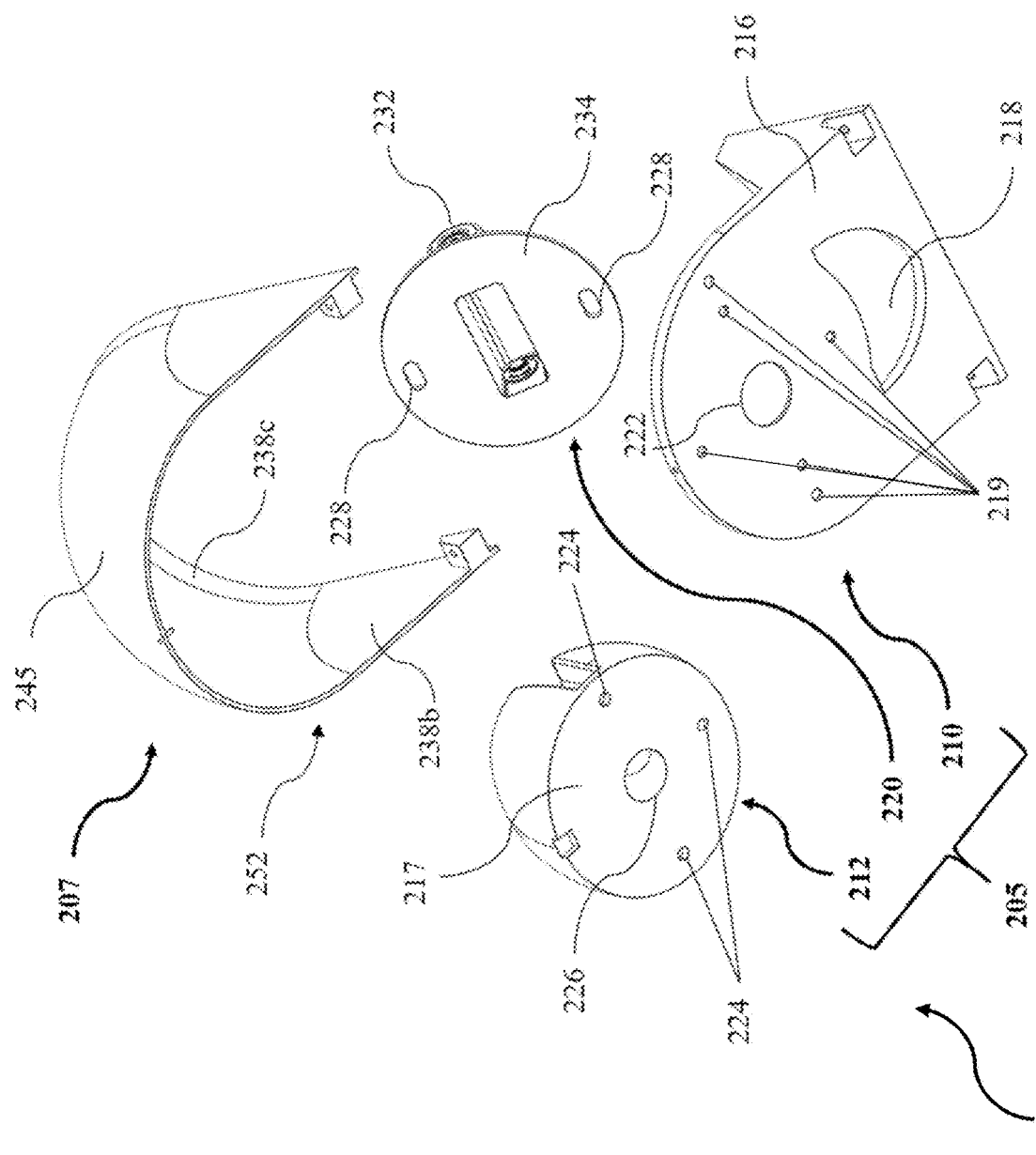
FIG. 3 is a rear exploded perspective view of an example camera mount and camera, according to aspects of the present disclosure.
Figure 4:
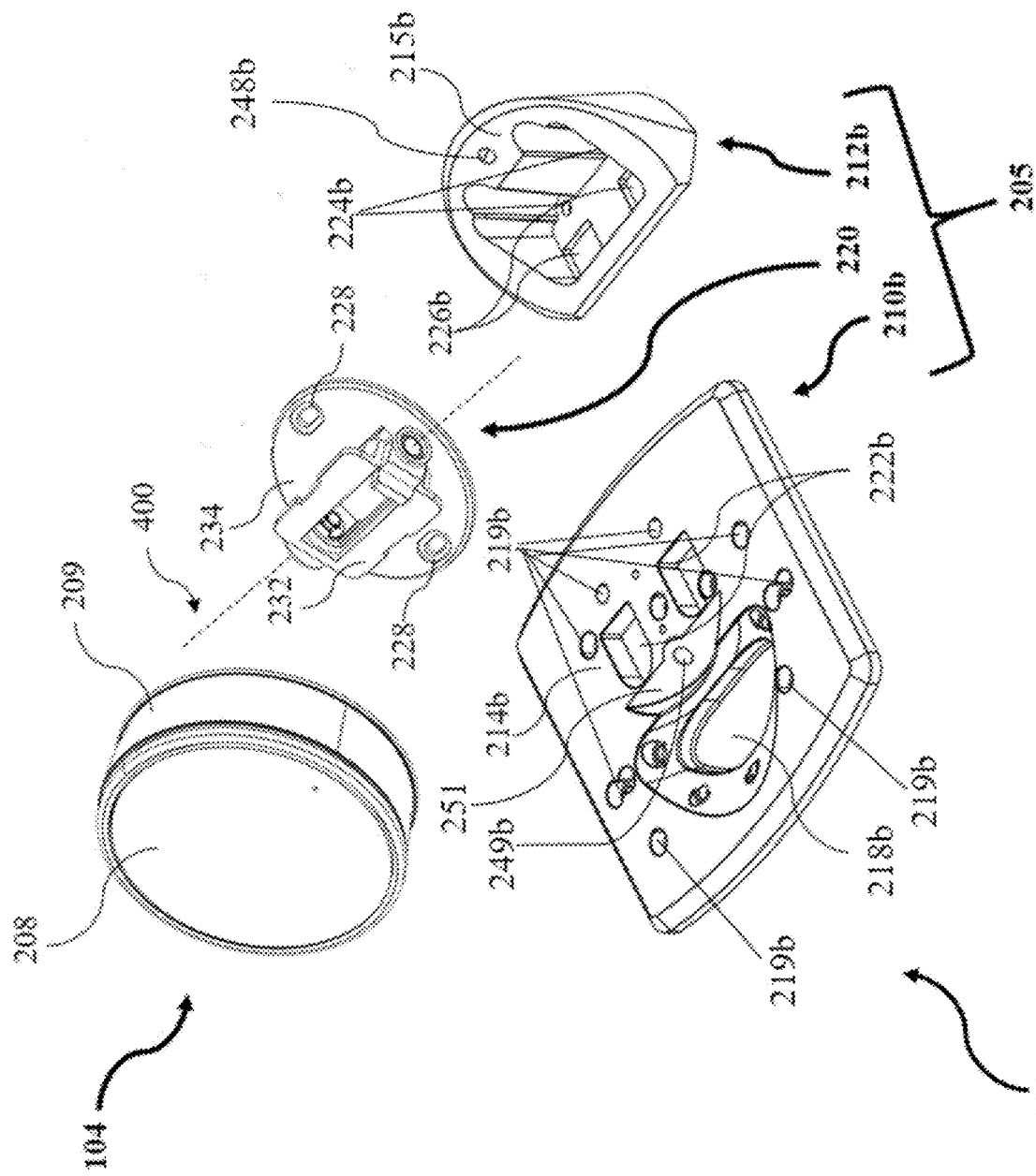
FIG. 4 is a front exploded perspective view of an example camera mount and camera, according to aspects of the present disclosure.

Referring to FIGS. 2-4, according to various aspects of the present disclosure, angled portion 212 and/or 212b may include a second cable opening 226 or series of openings 226b. The second cable route opening(s) 226 and/or 226b may be configured to align with first cable opening 222 and/or series of openings 222b, first cable opening(s) 222 and/or 222b and second cable opening(s) 226 and/or 226b interoperate to form a conduit through which a cable may be run, such that a cable may electrically connect camera 104 to an external power source through camera mount 102. Further, angled portion 212 and/or 212b may also include a plurality of mounting provisions 224, wherein mounting provisions 228 may be configured to facilitate fastening or securing of angled portion 212 and/or 212b to mounting component 210 and/or 212b at first mounting portion 214 and/or 214b.

Referring to FIGS. 2-5, angled portion 212 and/or 212b may be configured to be interoperable with mounting component 210 and/or 210b and angular adjusting bracket 220. In one example, angled portion 212 and/or 212b may be configured to include a plurality of mounting provisions 224, wherein mounting provisions 224 may be configured to align with mounting holes 219 of mounting component 210 and/or 210b and/or mounting holes 405 of angular adjustment bracket 220, so as to facilitate securing camera 104 to first surface 107. Any one or a combination of the mounting provisions 224 and/or 224b and/or 248b may be threaded and configured to receive a corresponding plurality of fasteners (not shown), wherein the plurality of fasteners may be threaded fasteners, and/or may be dimensioned to receive a self-tapping fasteners, to name a few examples. The fasteners may include any combination of screws, rivets, bolts or other similar devices configured to secure the plurality of modular components relative to each other via mounting provisions 224 and/or 224b, mounting holes 219 and/or 219b, and a plurality of mounting holes 228, wherein mounting holes 228 may be included in angular adjustment bracket 220. Thus, mounting provisions 224 and/or 224b, mounting holes 219 and/or 219b, and mounting holes 228 may each include recesses of a variety of shapes depending on the type, size, and shape of implemented fasteners. Angled portion 212 and/or 212b may also include a camera mounting surface 215 or 215b, respectively, wherein camera mounting surface 215 and/or 215b may be located thereon angled portion 212 and/or 212b, and be configured for mounting camera 104 thereto. Further, camera mounting surface 215 may be configured to be angled with respect to a mounting surface (e.g., first surface 107 in FIG. 1). As shown in FIG. 4, the mounting component 210b may further include an angled surface 251 configured to have a first portion of the base component 232 mounted thereto. Thus, when the angled portion 212b and mounting component 210b are assembled, the first portion of the mounting component 210b may be mounted to the angled surface 251 while a second portion of the mounting component 210b is mounted to a camera mounting surface 215b of the angled portion 212b.

According to various aspects, angled portion 212 and/or 212b may be configured to be interoperable with an angular adjustment bracket 220 at a camera mounting surface 215. Angular adjustment bracket 220 may include an adjusting component 232 fixed to a base 234. Adjusting component 232 may be configured to allow for the adjustment of an angle of camera 104, and thus camera lens 214 with relation to an external mounting surface. In one example, adjusting component 232 may comprise a pivoting member, wherein the pivoting member may allow camera 104 to rotate or pivot in an amount of at least 20° about an axis 400, relative an external mounting surface. In another example, adjusting component 232 may be a hinge configured to allow camera 104 to adjust the viewing angle. The base component 234 may be configured to secure angular adjustment bracket 220 to angled portion 212 at camera mounting surface 215. Referring to FIGS. 2-4, base component 234 may be cross-sectionally circular in area. In an example implementation, the circle is defined by a diameter of 95 millimeters (mm). In an additional example, base component 234 may be defined by a diameter between 60 mm and 150 mm, and in a third example base component 234 may include a diameter between 80 mm and 110 mm. The size of the cross-sectional area of base component 234 may be altered based on, for example, the size of the camera 104, or the mounting surface area of angled portion 213. Base component 234 may also include base component mounting provisions 228. The base component mounting provisions 228 may, for example, be a series of holes configured to align with mounting provisions 248 and/or 248b of angled portion 212 and/or 212b, and/or mounting holes 219 and/or 219b of mounting component 210 and/or 210b. Accordingly, the base component 234 of angular adjustment bracket 220 may be mountable to angled portion 212 and/or 212b, and/or mounting component 210 and/or 210b by passing a series of fasteners through base component mounting holes 228 into corresponding mounting provisions of either the angled portion 212 and/or 212b and/or the mounting component 210a and/or 210b.

Figure 5:
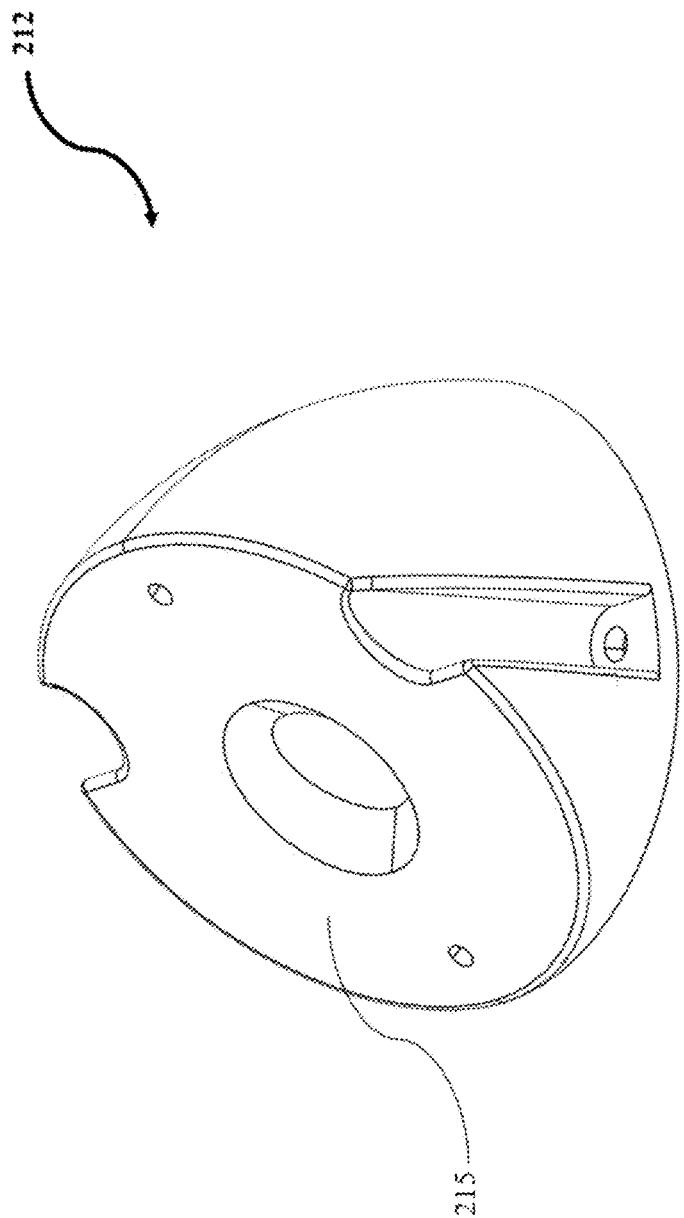
FIG. 5 is a perspective view of an example angled portion, according to aspects of the present disclosure.
Figure 6:
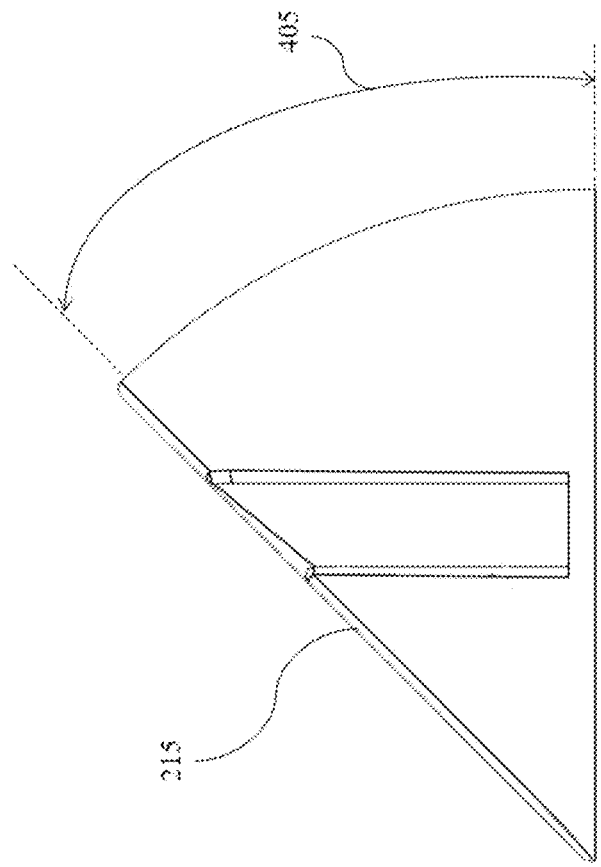
FIG. 6 is a side view of an example angled portion, according to aspects of the present disclosure.

Referring to FIGS. 5 and 6, angled portion 212 and/or 212b may be configured to include an angle 405 (see FIG. 6), wherein angle 405 of angled portion 212 and/or 212b may be configured to be modified to be larger or smaller based on a desired field of view of camera 104. Further, the value of angle 405 may be varied depending on the application and/or the adjustability of the camera 104. In some implementations, the angle 405 may be configured to be approximately 45°. In this case, the combination of angled portion 212 and/or 212b and adjusting component 230 may allow for camera 104 to be adjusted between 0° and 65°.

Figure 7:
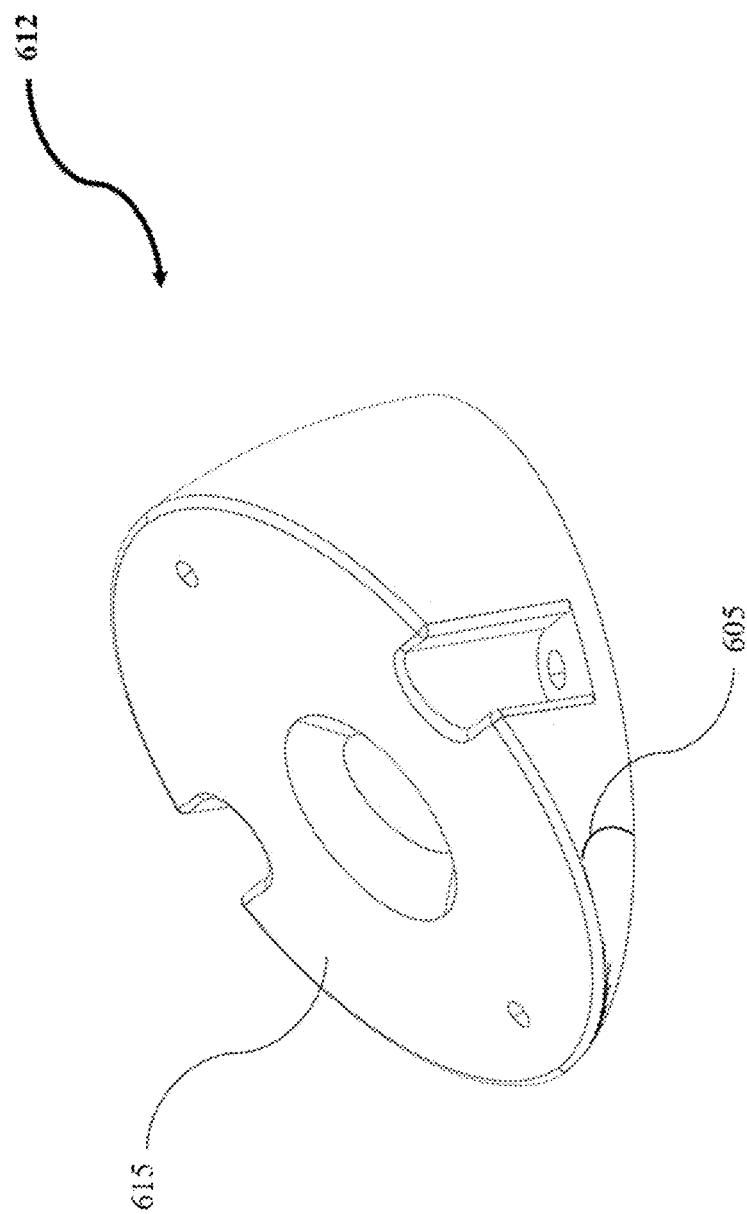
FIG. 7 is a perspective view of an example angled portion, according to aspects of the present disclosure.
Figure 8:
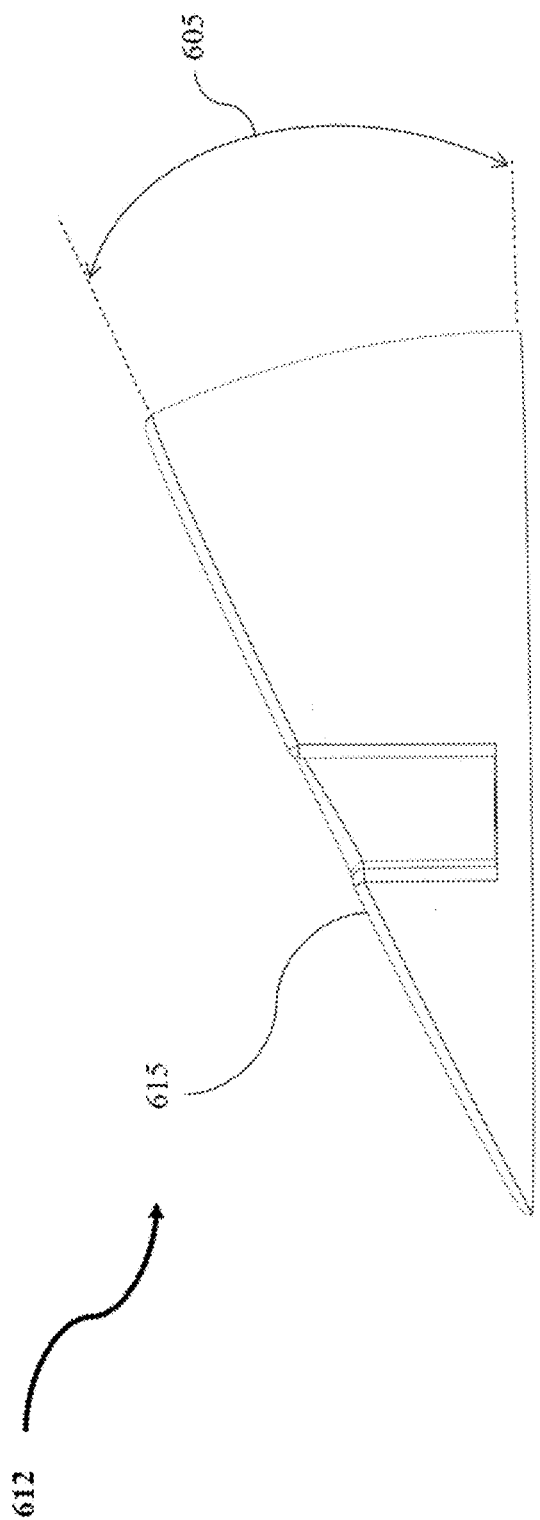
FIG. 8 is a side view of an example angled portion, according to aspects of the present disclosure.

Referring to FIGS. 7 and 8, and in contrast to the approximate 45° angle of angled portion 213 in FIGS. 5-6, an alternative configuration of the camera mount 102 includes an angled portion 612 (in place of angled portion 212 and/or 212b) forming a wedge shape having an angle 605 (see FIG. 7) less than angle 405 (see FIG. 6). In this example, angle 605 may be configured to be approximately 25°. Consequently, the slope of camera mounting surface 215 and/or 215b relative to a mounting surface, such as mounting surface 107 of FIGS. 2 and 3, of angled portion 212 (see FIGS. 2-6) may be comparatively steeper than the slope of a camera mounting surface 615 (see FIGS. 7-8). Thus, angled portion 212 and angled portion 612 may allow for a variety of different viewing angles for camera 104. Accordingly, by providing multiple angled portions as described above, e.g., angled portion 213 and/or 213b or angled portion 813, the camera mount 102 may be adaptable for use in a greater variety of locations and/or environments.

Figure 9:
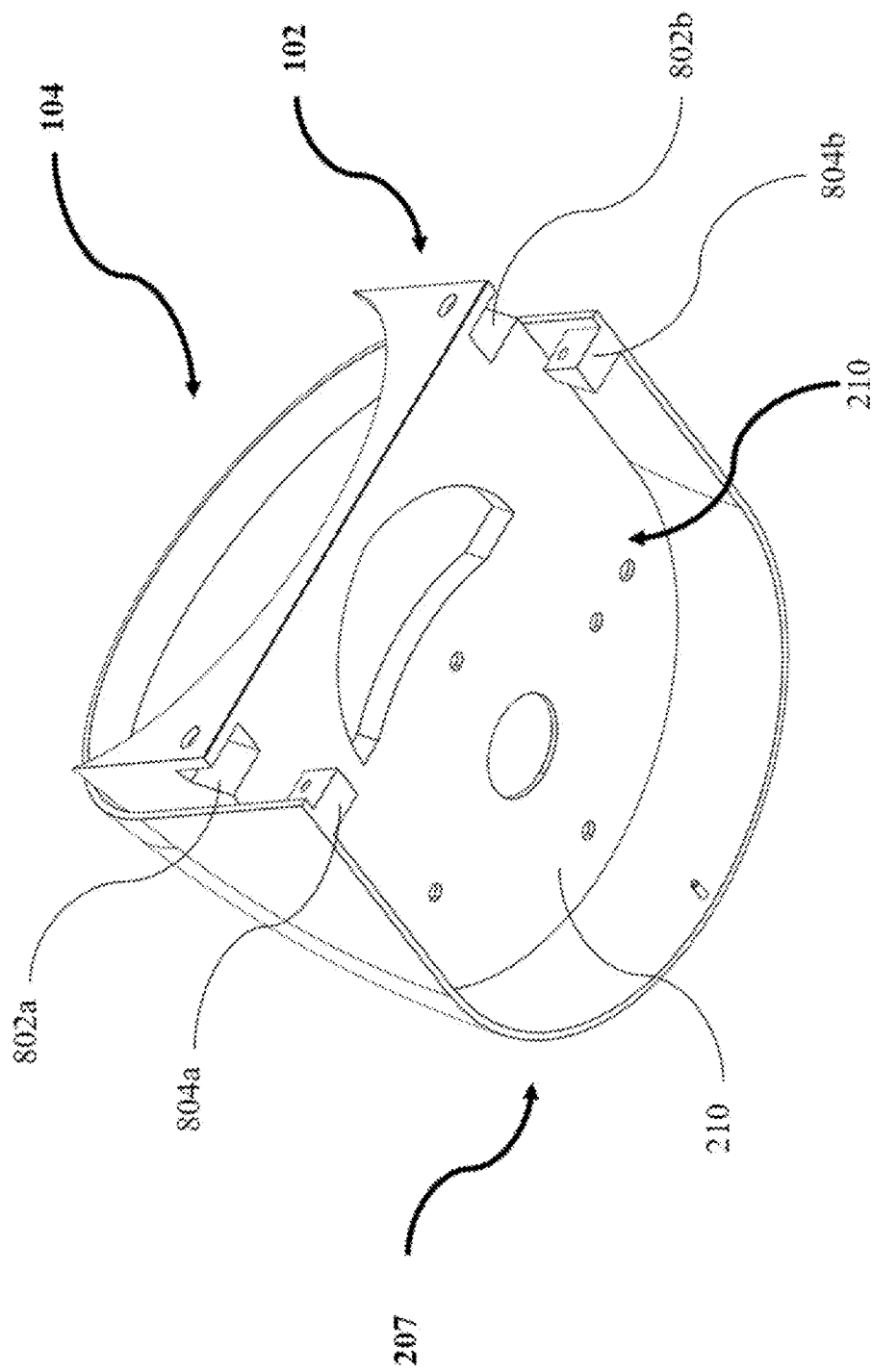
FIG. 9 is a front perspective view of an example assembled camera mount and camera, according to aspects of the present disclosure.
Figure 10:
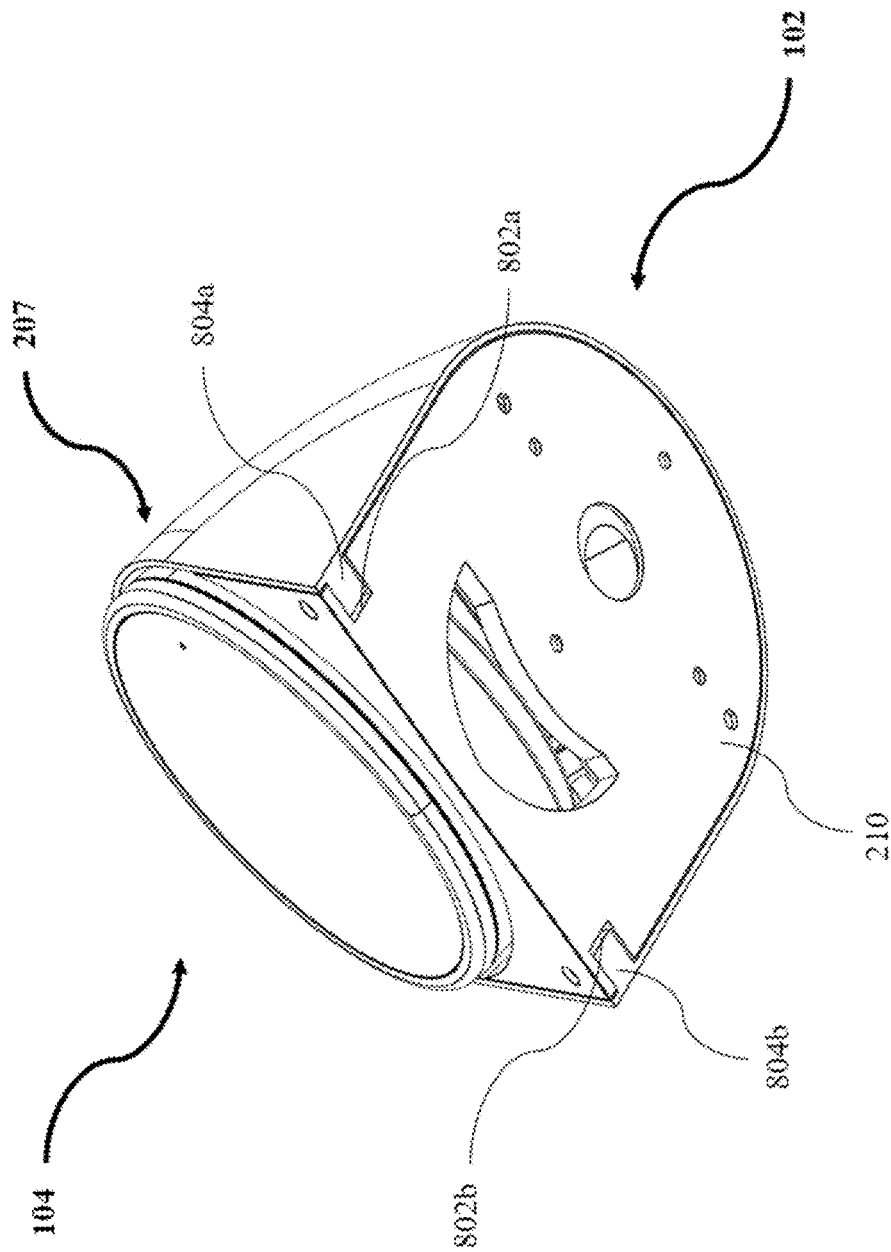
FIG. 10 is a rear perspective view of an example assembled camera mount and camera, according to aspects of the present disclosure.

Referring to FIGS. 9 and 10, mounting component 210 of camera mount 102 may further include a first cover tab receiving portion 802a and a second cover tab receiving portion 802b, and cover 207 of camera mount 102 may further include a first tab 804a and a second tab 804b. In this example, cover tab receiving portions 802a-802b may configured as recesses or openings, such that cover tab receiving portions 802a and 802b may receive first tab 804a and second tab 804b, respectively. In one example, FIG. 10, shows an example of mounting component 210 interlocked with cover 207. When both first cover tab receiving portion 802a interoperates with first tab 804a and second cover tab receiving portion 802b interoperates with second tab 804b, cover 207 may be secured to mounting portion 210, such that cover 207 may be positioned to at least partially cover and protect camera 104. Though FIG. 9 includes one specific description of the interlocking between cover 207 and mounting component 210, this description is not limiting. In another example, cover 207 may be configured to be fastened to mounting component 210 via a plurality of mounting provisions positioned within each cover 207 and mounting component 210, such that cover 207 may be secured to mounting component 210 via a plurality of fasteners.

Camera mount 102 and parts, such as bracket 205, mounting component 210, cover 207, or angled portion 212, for example, may be made of a variety of materials, such as a glass-filled polycarbonate material, metal, metal alloy, or other similar material that is sufficiently structurally rigid to support the camera 104 and the camera mount 102. For the purposes of this disclosure, the term "sufficiently structurally rigid" may be defined by the ability of a material to successfully endure an abuse test of at least 10 IK.

Figure 11:
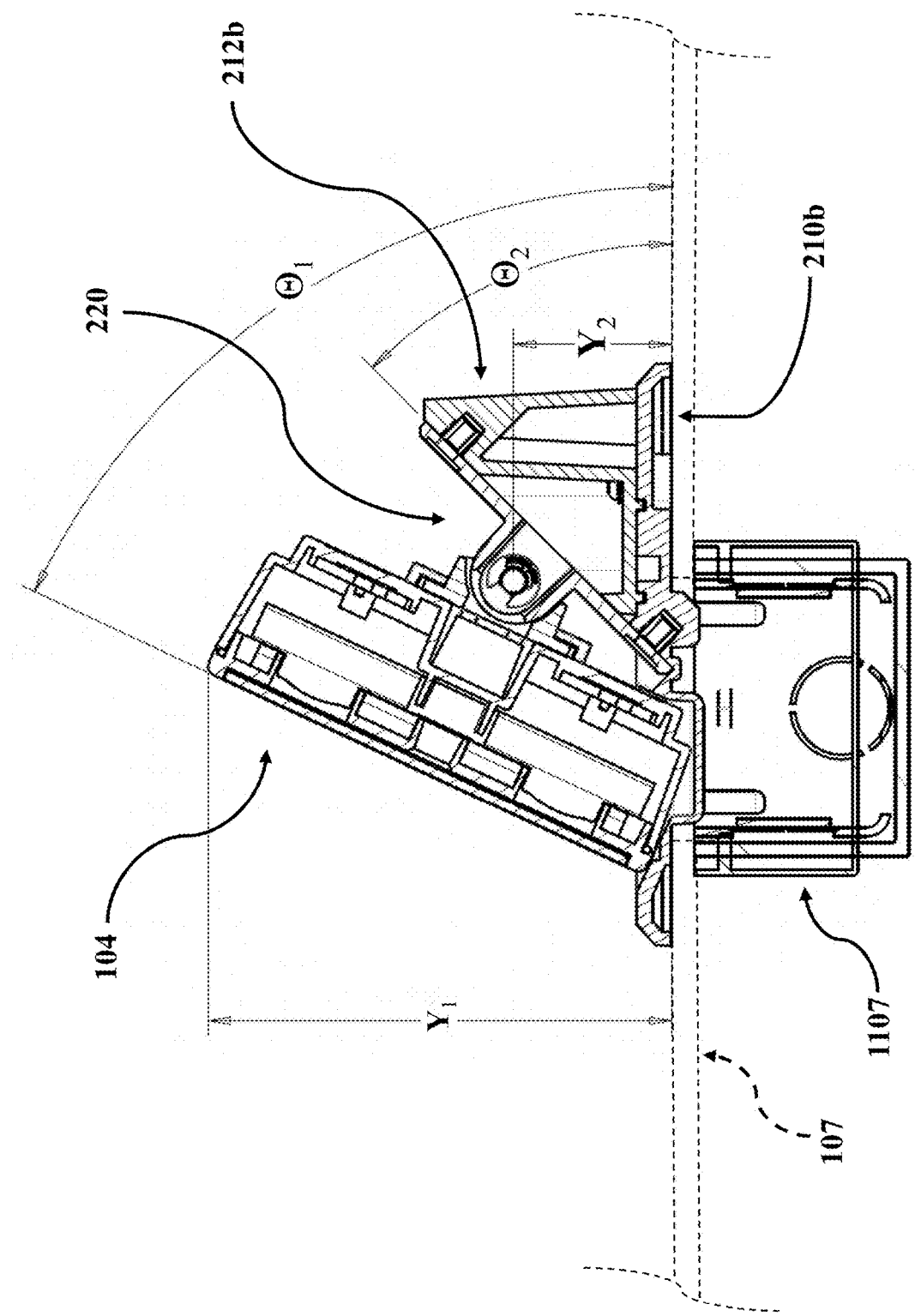
FIG. 11 is a side cut-away view of an example assembled camera mount and camera, mounted to a surface, according to aspects of the disclosure.
Figure 12:
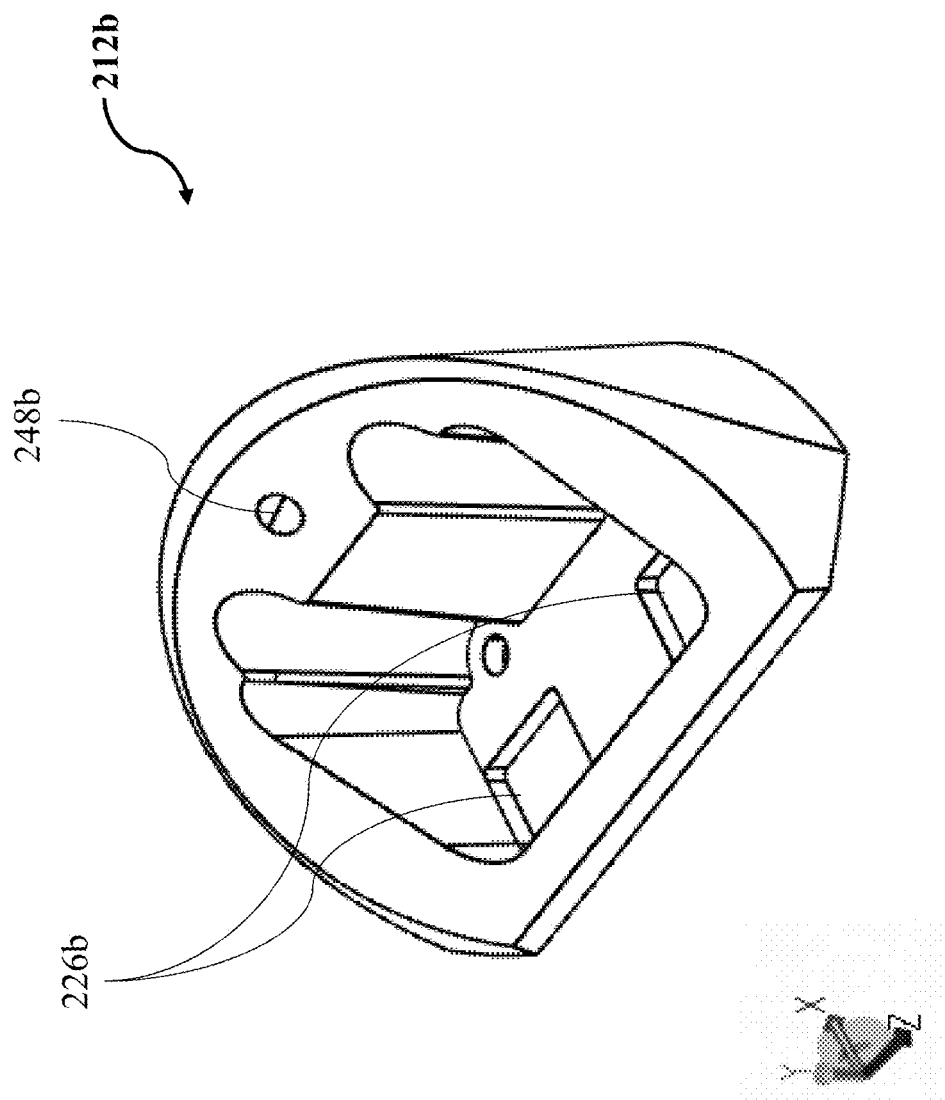
FIG. 12 is a right side perspective view of an example angled component according to aspects of the disclosure.
Figure 13B:
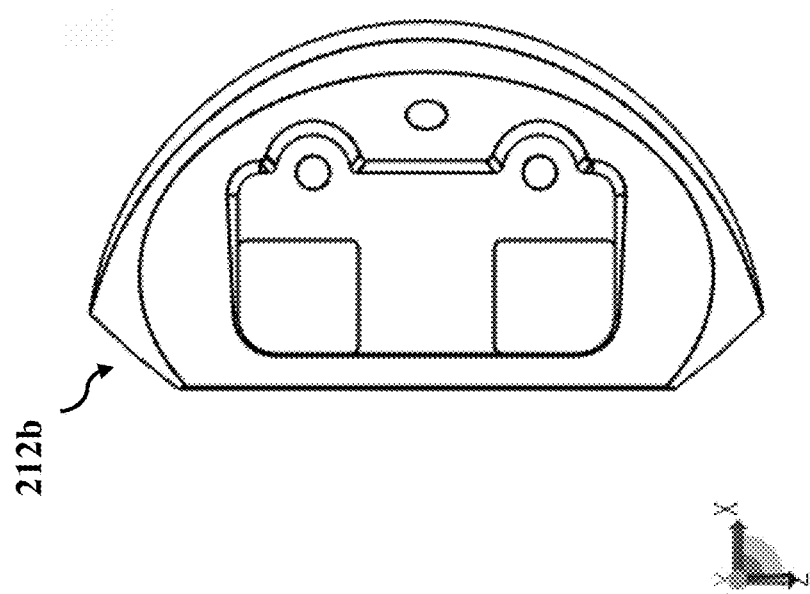
FIGS. 13A and 13B are top and bottom views of the example angled component of FIG. 12 according to aspects of the disclosure.
Figure 13A:
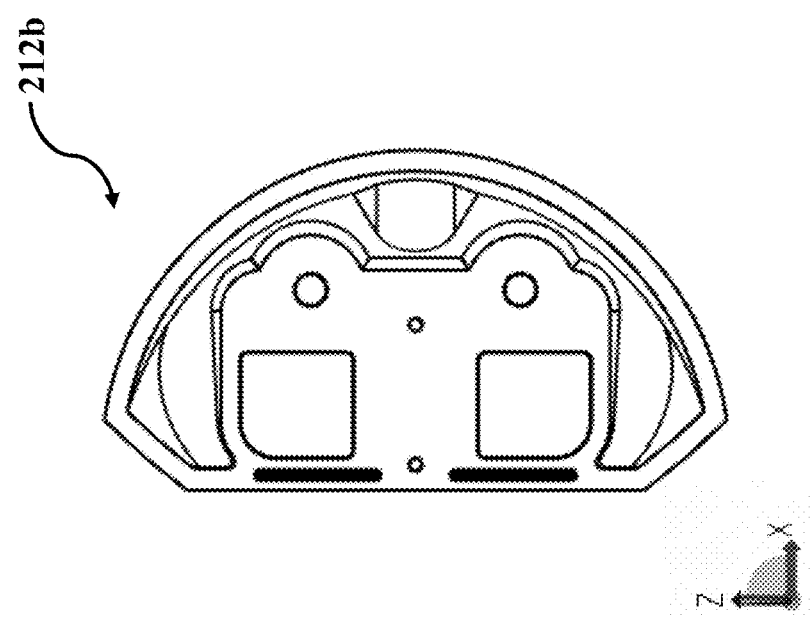
Figure 14B:
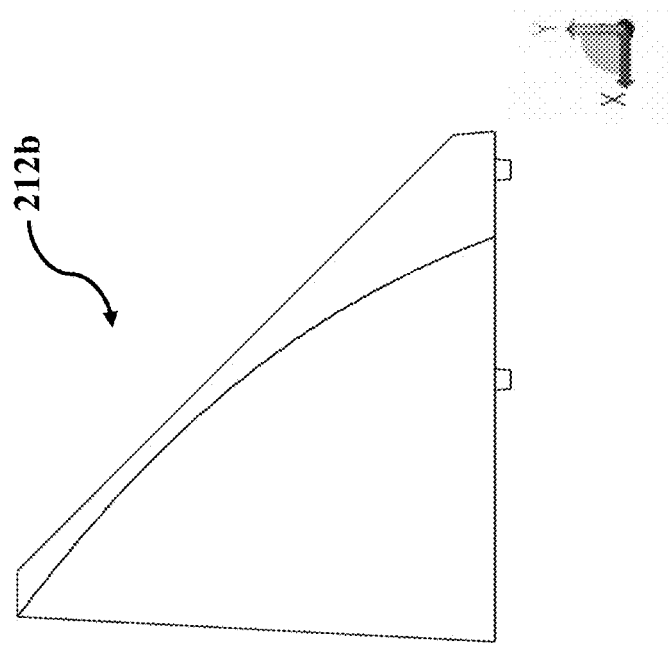
FIGS. 14A and 14B are right and left side views of the example angled component of FIGS. 12-13B according to aspects of the disclosure.
Figure 14A:
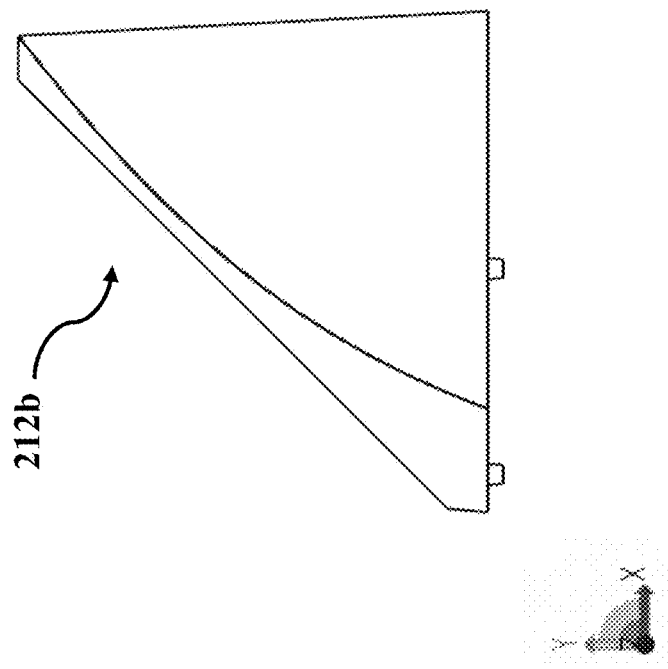
Figure 15B:
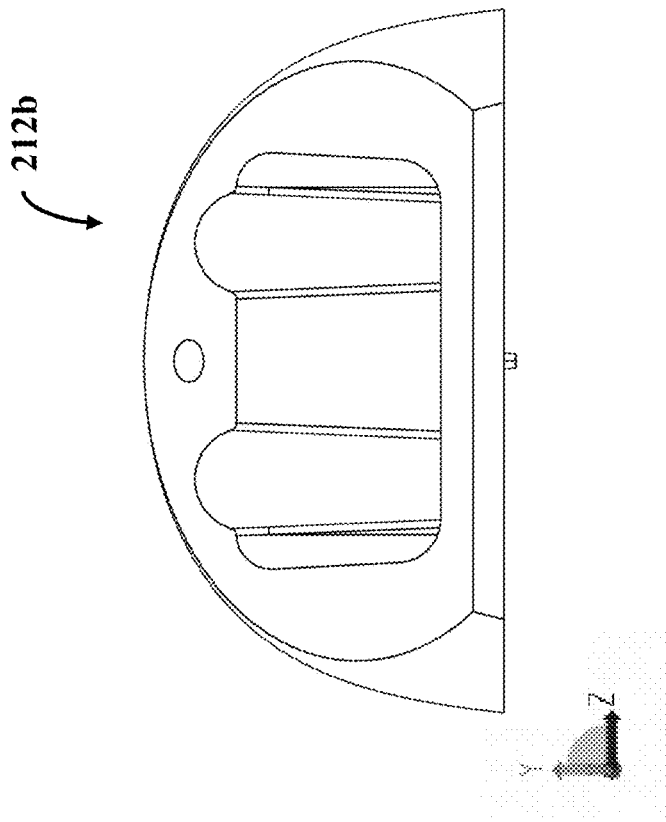
FIGS. 15A and 15B are front and back views of the example angled component of FIGS. 12-14B according to aspects of the disclosure.
Figure 15A:
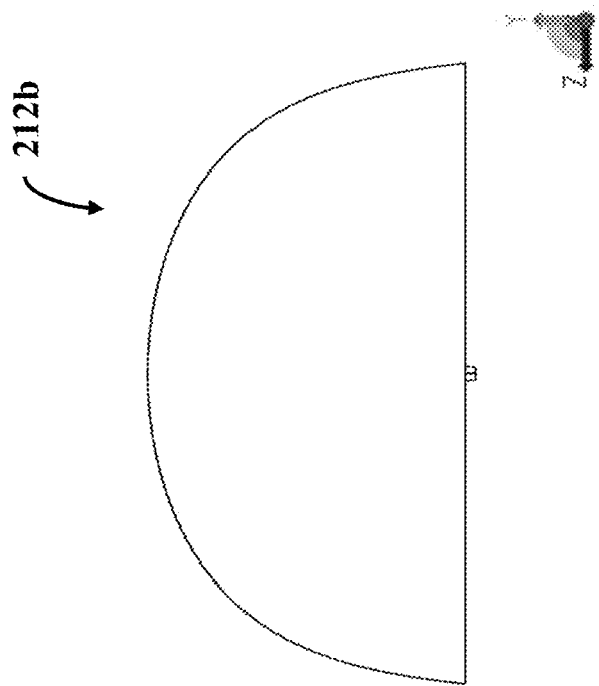
Figure 16:
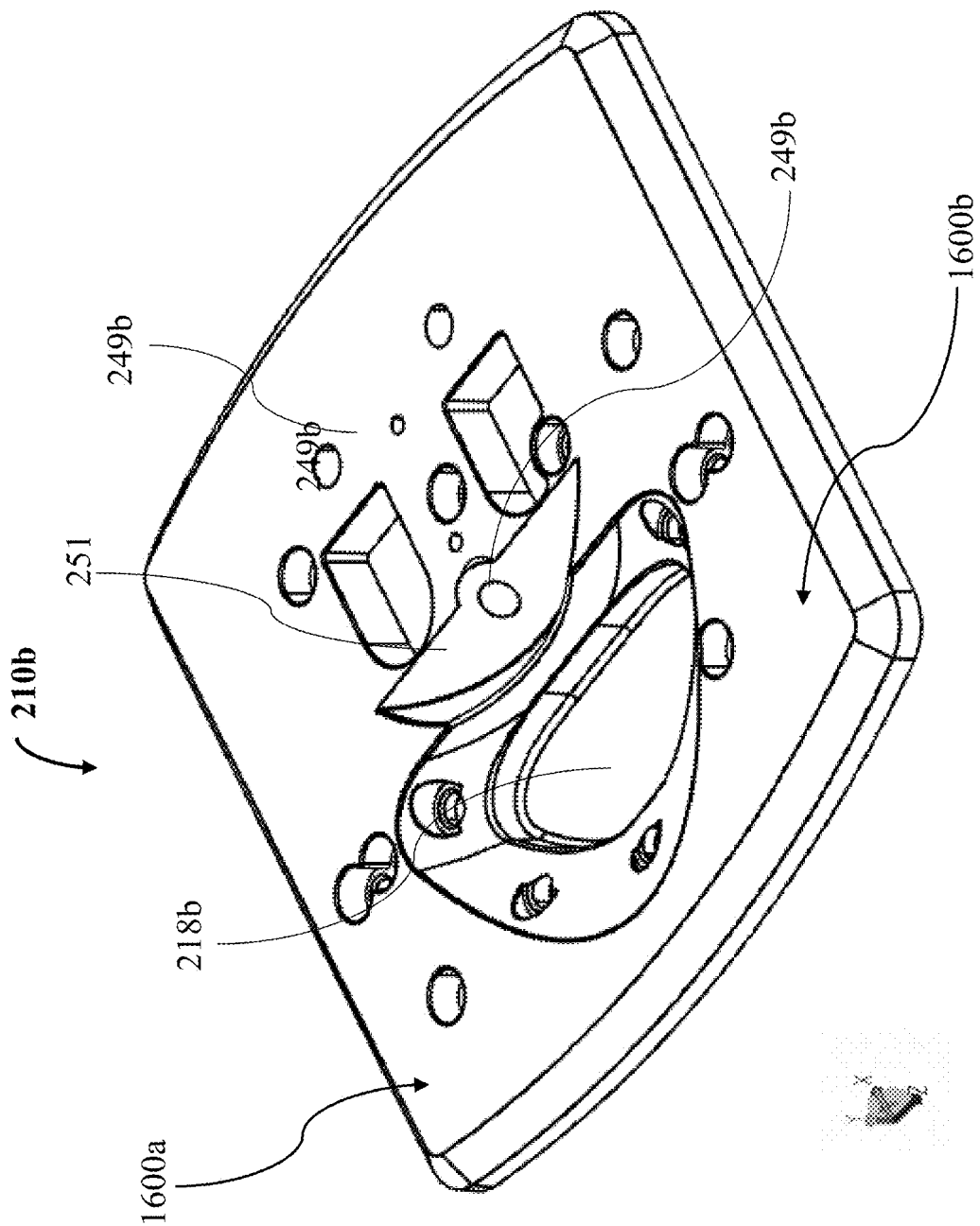
FIG. 16 is a right side perspective view of an example mounting component according to aspects of the disclosure.
Figure 19A:
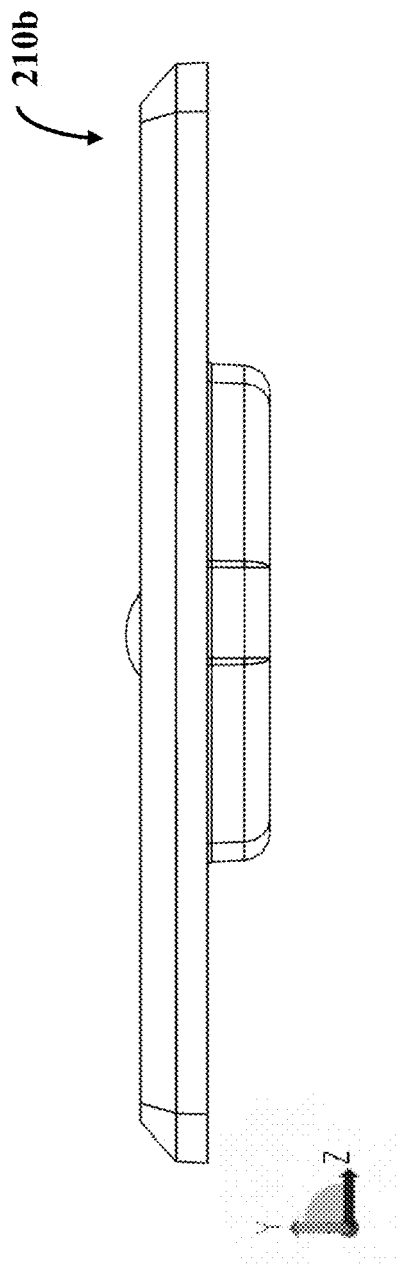
FIGS. 19A and 19B are rear and right side views of the example mounting component of FIGS. 16-18B according to aspects of the disclosure.
Figure 19B:
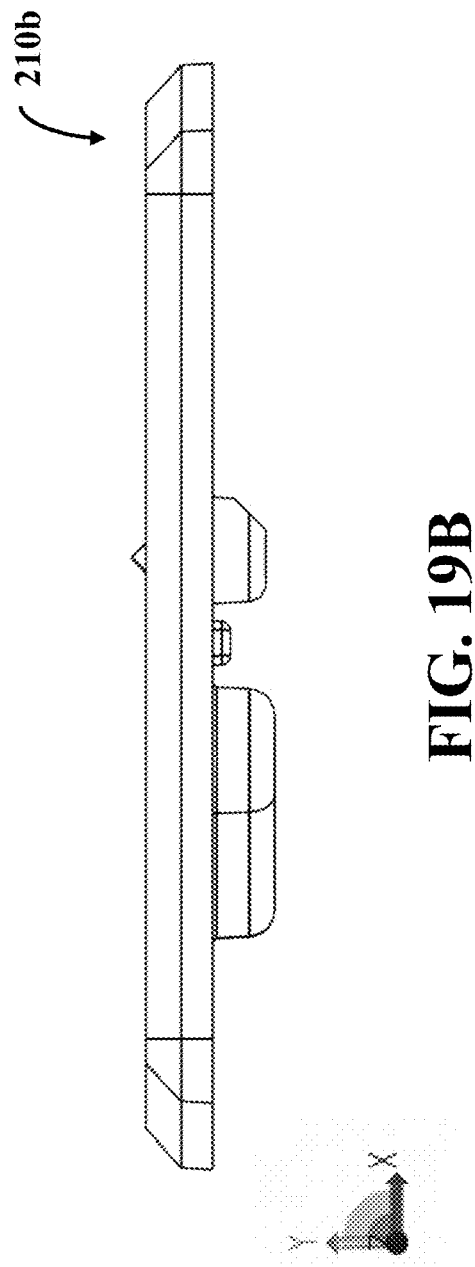

FIG. 11 shows one example of the camera 104 mounted to a surface 107 with an electrical box 1107 or other cavity behind surface 107. In one example, the electrical box may for example be any standard electrical box or other cavity that is designed to be mounted behind a surface 107. For example, surface 107 may be a surface comprised of sheetrock or plaster with a "gang box" mounted behind surface 107 with an opening in surface 107 allowing access into electrical box 1107. The camera 104 may be mounted to surface 107 via any one or a combination of camera mount assemblies disclosed herein. In one example, the camera 104 may be mounted to the surface via a mounting component 210b, an angled portion 212b, and an angular adjustment bracket 220. With a camera mounted at an angle of $\Theta_1$, the camera system may be configured to protrude a specific distance $Y_1$ from surface 107. In one example, the distance $Y_1$ may be configured to be between 80 millimeters "mm" and 110 mm. In another example, the distance $Y_1$ may be configured to be between 90 mm and 105 mm. In another example, the distance $Y_1$ may be configured to be a minimum of 80 mm and a maximum of 101.6 mm. In another example, the distance $Y_1$ may be less than or equal to 101.6 mm or 4 inches. The aforementioned aspects may allow of the camera to have a proper line-of-sight and/or field of view while not protruding excessively from a surface 107. In one example, the angle $\Theta_1$ may be between 60 degrees and 70 degrees. In a preferred example, the angle $\Theta_1$ may be approximately 65 degrees. In one example usable with aspects of the disclosure, the angle $\Theta_2$ may be between 40 degrees and 50 degrees. In a preferred example usable with aspects of the disclosure, the angle $\Theta_2$ may be approximately 45 degrees. In one example, the distance $Y_2$ may be configured to be between 30 mm and 38 mm. In a preferred example, the distance $Y_2$ may be approximately 33.9 mm.

While the aspects described herein have been described in conjunction with the example aspects outlined above, various alternatives, modifications, variations, improvements, and/or substantial equivalents, whether known or that are or may be presently unforeseen, may become apparent to those having at least ordinary skill in the art. Accordingly, the example aspects, as set forth above, are intended to be illustrative, not limiting. Various changes may be made without departing from the spirit and scope of the disclosure. Therefore, the disclosure is intended to embrace all known or later-developed alternatives, modifications, variations, improvements, and/or substantial equivalents.

Thus, the claims are not intended to be limited to the aspects shown herein, but are to be accorded the full scope consistent with the language of the claims, wherein reference to an element in the singular is not intended to mean "one and only one" unless specifically so stated, but rather "one or more." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

Further, the word "example" is used herein to mean "serving as an example, instance, or illustration." Any aspect described herein as "example" is not necessarily to be construed as preferred or advantageous over other aspects. Unless specifically stated otherwise, the term "some" refers to one or more. Combinations such as "at least one of A, B, or C," "at least one of A, B, and C," and "A, B, C, or any combination thereof" include any combination of A, B, and/or C, and may include multiples of A, multiples of B, or multiples of C. Specifically, combinations such as "at least one of A, B, or C," "at least one of A, B, and C," and "A, B, C, or any combination thereof" may be A only, B only, C only, A and B, A and C, B and C, or A and B and C, where any such combinations may contain one or more member or members of A, B, or C. Nothing disclosed herein is intended to be dedicated to the public regardless of whether such disclosure is explicitly recited in the claims.

What is claimed is:

1. A camera and camera mount assembly comprising:
   a camera;
   a bracket configured to be mounted to a first surface and the camera at a camera mounting portion, wherein the bracket further comprises a mounting portion and an angled portion having the camera mounting portion thereon and configured to mount to the mounting portion; and
   a cover configured to cover at least a portion of the bracket and the camera, wherein the cover includes a first tab and a second tab, and wherein the bracket includes a first tab receiving portion configured to receive the first tab and a second tab receiving portion configured to receive the second tab, and wherein the bracket comprises a first cover interface section extending from the bracket at a first location proximal to the first tab receiving portion and a second cover interface section extending from the bracket at a second location proximal to the second tab receiving portion.

2. The camera mount assembly of claim 1, wherein the cover is configured to be installed onto the bracket so that a first and second surface portions abut corresponding first and second cover interface surfaces of the first and second cover interface sections, wherein the first and second cover interface surfaces provides structural support to the cover via frictional contact between the first and second cover interface surfaces of the bracket and the first and second surface portions of the cover.

3. The camera mount assembly of claim 2, wherein the first and second surface portions and the first and second cover interface sections are curved surfaces.

4. The camera mount assembly of claim 3, wherein the cover includes an opening having a first opening portion providing a line-of-sight for at least a field of view of the camera and second opening portion for receiving at least a part of the bracket at a cover receiving portion.

5. The camera mount assembly of claim 1, wherein the bracket further comprises a clearance section positioned to allow additional clearance for angling of the camera.

6. The camera mount assembly of claim 5, wherein the clearance section is a concave section of the mounting portion of the bracket.

7. The camera mount assembly of claim 6, further comprising an angular adjustable bracket, wherein the angular adjustable bracket is configured to mount to the camera mounting portion and have the camera mounted thereto, wherein the angular adjustable bracket allows for angular adjustment of the camera relative to the camera mounting surface.

8. A camera mount assembly comprising:
   a bracket configured to be mounted to a first surface and a camera at a camera mounting portion, wherein the bracket further comprises a mounting portion and an angled portion having the camera mounting portion thereon and configured to connect to the mounting portion, wherein the bracket further comprises a clearance section positioned to allow additional clearance for angling of the camera mounted to the bracket.

9. The camera mount assembly of claim 8 further comprising a cover configured to cover at least a portion of the bracket and the camera, wherein the cover includes a cover interface configured to interface with a bracket interface of the bracket.

10. The camera mount assembly of claim 9, wherein the angled portion and the mounting portion are connected as a unitary structure.

11. The camera mount assembly of claim 9, wherein the cover is configured to be installed onto the bracket so that a cover interface surface abuts a bracket interface surface, Wherein the bracket interface surface provides structural support to the cover via frictional contact between the bracket interface surface and the cover interface surface.

12. The camera mount assembly of claim 11, wherein the bracket interface surface and the cover interface surface are curved surfaces.

13. The camera mount assembly of claim 12, wherein the cover includes a cover first opening portion providing a line-of-sight for at least a field of view of the camera and a second cover opening portion for receiving a portion at least a part of the bracket at a cover receiving portion.

14. The camera mount assembly of claim 13, wherein the bracket further comprises a first tab receiving portion configured to receive a first tab of the cover and a second tab receiving portion configured to receive a second tab of the cover, and wherein the bracket interface further comprises a first cover interface section extending from the bracket at a first location proximal to the first tab receiving portion and a second cover interface section extending from the bracket at a second location proximal to the second tab receiving portion.

15. The camera mount assembly of claim 8, wherein the clearance section is an opening in the mounting portion of the bracket.

16. The camera mount assembly of claim 15, wherein the clearance section is a concave section of the mounting portion of the bracket.

17. A camera mount assembly comprising:
   a bracket configured to be mounted to a first surface and a camera at a camera mounting portion, wherein the bracket further comprises a mounting portion and an angled portion having the camera mounting portion thereon and configured to connect to the mounting portion; and
   a cover configured to cover at least a portion of the bracket and the camera, wherein the cover includes a first tab, and wherein the bracket includes a first tab engagement portion configured to engage with the first tab, and wherein the bracket comprises a first cover interface section extending from the bracket at a location proximal to the first tab engagement portion.

18. The camera mount assembly of claim 17, wherein the first tab engagement portion is a first tab receiving portion configured to receive the first tab, and wherein the cover is configured to be installed onto the bracket so that the first cover interface section abuts with a surface portion of the cover and provides structural support to the cover via frictional contact between the first cover interface section and the surface portion of the cover.

19. The camera mount assembly of claim 18, wherein the first cover interface section and the surface portion of the cover are both curved surfaces.

20. The camera mount assembly of claim 17, wherein the angled portion and the mounting portion are connected at the mounting portion and form a unitary structure.

* * * * *